(12) United States Patent
Ushiyama

(10) Patent No.: US 8,347,197 B2
(45) Date of Patent: Jan. 1, 2013

(54) TERMINAL DEVICE, TIME ADJUSTING METHOD OF TERMINAL DEVICE AND COMMUNICATION SYSTEM

(75) Inventor: Kentaro Ushiyama, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 593 days.

(21) Appl. No.: 12/585,698

(22) Filed: Sep. 22, 2009

(65) Prior Publication Data

US 2010/0083076 A1 Apr. 1, 2010

(30) Foreign Application Priority Data

Sep. 26, 2008 (JP) .................................. 2008-249281

(51) Int. Cl.
*H03M 13/03* (2006.01)
*G06K 5/04* (2006.01)

(52) U.S. Cl. ........................................ 714/798; 714/700
(58) Field of Classification Search ........................ None
See application file for complete search history.

(56) References Cited

U.S. PATENT DOCUMENTS

| | | | | |
|---|---|---|---|---|
| 6,009,086 A | * | 12/1999 | Freeburg et al. | ........... 370/310.2 |
| 6,094,169 A | * | 7/2000 | Smith et al. | .................... 342/465 |
| 6,570,856 B1 | * | 5/2003 | Freeburg et al. | ........... 370/310.1 |
| 6,970,436 B2 | * | 11/2005 | Park | ........................... 370/310.1 |
| 7,253,671 B2 | * | 8/2007 | Hall et al. | ..................... 327/165 |
| 2007/0104259 A1 | * | 5/2007 | Herring et al. | ................ 375/219 |
| 2007/0283043 A1 | * | 12/2007 | Kiyohara et al. | ............. 709/243 |

FOREIGN PATENT DOCUMENTS

| JP | A-2004-117231 | 4/2004 |
|---|---|---|
| JP | A-2005-257484 | 9/2005 |
| JP | A-2006-197400 | 7/2006 |

OTHER PUBLICATIONS

Oct. 2, 2012 Office Action for Japanese Patent Application No. 2008-249281 (with translation).

* cited by examiner

*Primary Examiner* — Ajay Bhatia
*Assistant Examiner* — Daniel McMahon
(74) *Attorney, Agent, or Firm* — Oliff & Berridge, PLC

(57) ABSTRACT

A terminal device includes: a time information receiving unit which receives measured time and an estimated error of another terminal device; an estimated error calculating unit which calculates an error containing the estimated error of another terminal device received by the time information receiving unit as an updating-use estimated error; and a time updating unit which, when the updating-use estimated error calculated by the estimated error calculating unit is smaller than an estimated error stored in an estimated error memory unit, stores the updating-use estimated error calculated by the estimated error calculating unit in the estimated error memory unit thus updating the estimated error stored in the estimated error memory unit, and adjusts a measured time measured by a time measuring unit in response to the measured time of another terminal device received by the time information receiving unit.

8 Claims, 14 Drawing Sheets

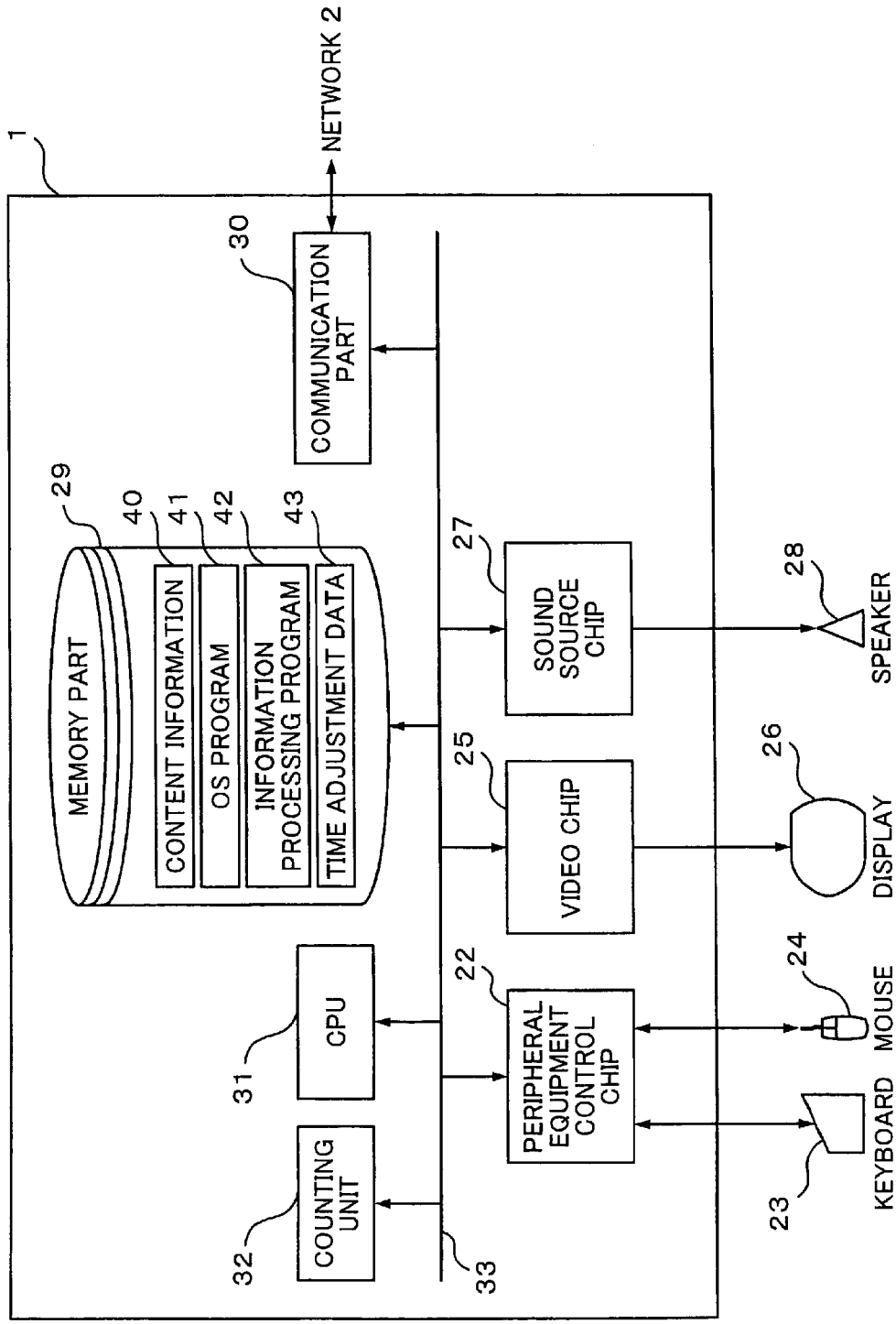

TERMINAL DEVICE, TIME ADJUSTING METHOD OF TERMINAL DEVICE AND COMMUNICATION SYSTEM

CROSS-REFERENCE TO RELATED APPLICATIONS

This application is based on and claims the benefit of priority from Japanese Patent Application No. 2008-249281 filed on Sep. 26, 2008.

BACKGROUND

1. Field

The present invention relates to a terminal device, a time adjusting method of the terminal device and a communication system, and more particularly to a terminal device which includes a time measuring unit for measuring time and adjusts the time measuring unit based on time information obtained from another device, a time adjusting method of the terminal device and a communication system which includes a plurality of terminal devices.

2. Description of the Related Art

A terminal device (for example, a personal computer) which is connected to a network such as the Internet incorporates a time measuring unit which measures time therein in general, and the terminal device performs various operations based on time measured by the time measuring unit. For example, the terminal device performs operations such as updating of an application installed in the terminal device or the collection of log data at predetermined times.

Accordingly, when an error occurs between time measured by the time measuring unit and actual time, it is necessary to adjust the time of the time measuring unit.

With respect to a method for performing time adjustment of a terminal device connected to a network, an NTP (Network Time Protocol) has been used most popularly. In this method, respective terminal devices obtain data on reference time from an NTP server which measures the reference time, and each terminal device adjusts time of a time measuring unit incorporated therein to the reference time (for example, see JP-A-2004-117231 (patent document 1)).

SUMMARY

However, when communication on time information is performed for time adjustment between a plurality of terminal devices and a server in the above-mentioned manner, there exists a possibility that traffic is concentrated on the server so that a large communication burden is imposed on the server.

It is an object of the present invention to provide a terminal device having a time adjusting function which can suppress the concentration of traffic.

According to one aspect of the present invention, there is provided a terminal device which includes: a time measuring unit which is configured to measure time; an estimated error memory unit which is configured to store an estimated error between a measured time measured by the time measuring unit and current time; a time information requesting unit which is configured to request another terminal device to transmit a measured time and an estimated error of the above-mentioned another terminal device; a time information transmitting unit which is configured to transmit the measured time measured by the time measuring unit and the estimated error stored in the estimated error memory unit to the above-mentioned another terminal device in response to a request from the above-mentioned another terminal device; a time information receiving unit which is configured to receive the measured time and the estimated error of the above-mentioned another terminal device requested by the time information requesting unit; an estimated error calculating unit which is configured to calculate an error containing the estimated error of the above-mentioned another terminal device received by the time information receiving unit as an updating-use estimated error; and a time updating unit which is configured, when the updating-use estimated error calculated by the estimated error calculating unit is smaller than the estimated error stored in the estimated error memory unit, to store the updating-use estimated error in the estimated error memory unit thus updating the estimated error, and to adjust the measured time measured by the time measuring unit based on the measured time of said another terminal device received by the time information receiving unit.

According to another aspect of the present invention, there is provided a computer readable storage medium storing a program causing a computer of a terminal device to execute processing of: storing an estimated error between a measured time measured by a time measuring unit of the terminal device and current time in an estimated error memory unit; requesting another terminal device to transmit a measured time and an estimated error of the above-mentioned another terminal device; transmitting the measured time measured by the time measuring unit and the estimated error stored in the estimated error memory unit to the above-mentioned another terminal device in response to a request from the above-mentioned another terminal device; receiving the measured time and the estimated error of the above-mentioned another terminal device which are requested in said step of requesting the transmission of the measured time and the estimated error of the above-mentioned another terminal device; calculating an error which contains the estimated error of the above-mentioned another terminal device received in the step of receiving the measured time and the estimated error of the above-mentioned another terminal device as an updating-use estimated error; determining whether or not updating-use estimated error calculated in the step of calculating the updating-use estimated error is smaller than the estimated error stored in the estimated error memory unit; adjusting the measured time measured by the time measuring unit based on the measured time of said another terminal device received in the step of receiving the measured time and the estimated error of said another terminal device when updating-use estimated error is smaller than the estimated error in the step of determining whether or not the updating-use estimated error is smaller than the estimated error; and updating the estimated error by storing the updating-use estimated error as an estimated error in the estimated error memory unit when updating-use estimated error is smaller than the estimated error in the step of determining whether or not the updating-use estimated error is smaller than the estimated error.

According to still another aspect of the present invention, there is provided a communication system which includes a plurality of terminal devices and is configured to perform transmission/reception of information between the terminal devices, wherein said each terminal device which includes: a time measuring unit which is configured to measure time; an estimated error memory unit which is configured to store an estimated error between a measured time measured by the time measuring unit and current time; a time information requesting unit which is configured to request other terminal device to transmit a measured time and an estimated error of the above-mentioned another terminal device; a time information transmitting unit which is configured to transmit the measured time measured by the time measuring unit and the estimated error stored in the estimated error memory unit to the above-mentioned another terminal device in response to a request from other terminal device; a time information receiving unit which is configured to receive the measured time and the estimated error of the above-mentioned another terminal device requested by the time information requesting unit; an estimated error calculating unit which is configured to calculate an error containing the estimated error of the above-mentioned another terminal device received by the time information receiving unit as an updating-use estimated error; and a time updating unit which is configured, when the updating-use estimated error calculated by the estimated error calculating unit is smaller than the estimated error stored in the estimated error memory unit, to store the updating-use estimated error in the estimated error memory unit thus updating the estimated error, and to adjust the measured time measured by the time measuring unit based on the measured time of another terminal device received by the time information receiving unit.

According to further another aspect of the present invention, there is provided a time adjustment method of terminal devices in a communication system which includes a plurality of terminal devices and is configured to perform transmission/reception of information between the terminal devices. The time adjustment method includes the steps of: storing an estimated error between a measured time measured by a time measuring unit of the terminal device and current time in an estimated error memory unit; requesting other terminal device to transmit a measured time and an estimated error of the above-mentioned another terminal device; transmitting the measured time measured by the time measuring unit and the estimated error stored in the estimated error memory unit to the above-mentioned another terminal device in response to a request from the above-mentioned another terminal device; receiving the measured time and the estimated error of the above-mentioned another terminal device which are requested in said step of requesting the transmission of the measured time and the estimated error of the above-mentioned another terminal device; calculating an error which contains the estimated error of the above-mentioned another terminal device received in the step of receiving the measured time and the estimated error of the above-mentioned another terminal device as an updating-use estimated error; determining whether or not updating-use estimated error calculated in the step of calculating the updating-use estimated error is smaller than the estimated error stored in the estimated error memory unit; adjusting the measured time measured by the time measuring unit based on the measured time of said another terminal device received in the step of receiving the measured time and the estimated error of said another terminal device when updating-use estimated error is smaller than the estimated error in the step of determining whether or not the updating-use estimated error is smaller than the estimated error; and updating the estimated error by storing the updating-use estimated error calculated in the step of calculating the updating-use estimated error in the estimated error memory unit as an estimated error in the estimated error memory unit when updating-use estimated error is smaller than the estimated error in the step of determining whether or not the updating-use estimated error is smaller than the estimated error.

BRIEF DESCRIPTION OF THE DRAWINGS

FIG. 5 is a view showing specific constitution of the terminal device of the communication system according to the first embodiment;

DETAILED DESCRIPTION

Hereinafter, some embodiments of a communication system and terminal devices of the communication system according to the present invention are explained in conjunction with drawings. The communication system of each embodiment includes a plurality of terminal devices each of which has a time measuring unit for measuring time, and each terminal device can adjust a time measuring unit of its own terminal device in response to a measured time measured by a time measuring unit of another terminal device.

1. First Embodiment 1.1. Summary of Communication System

Figure 1:
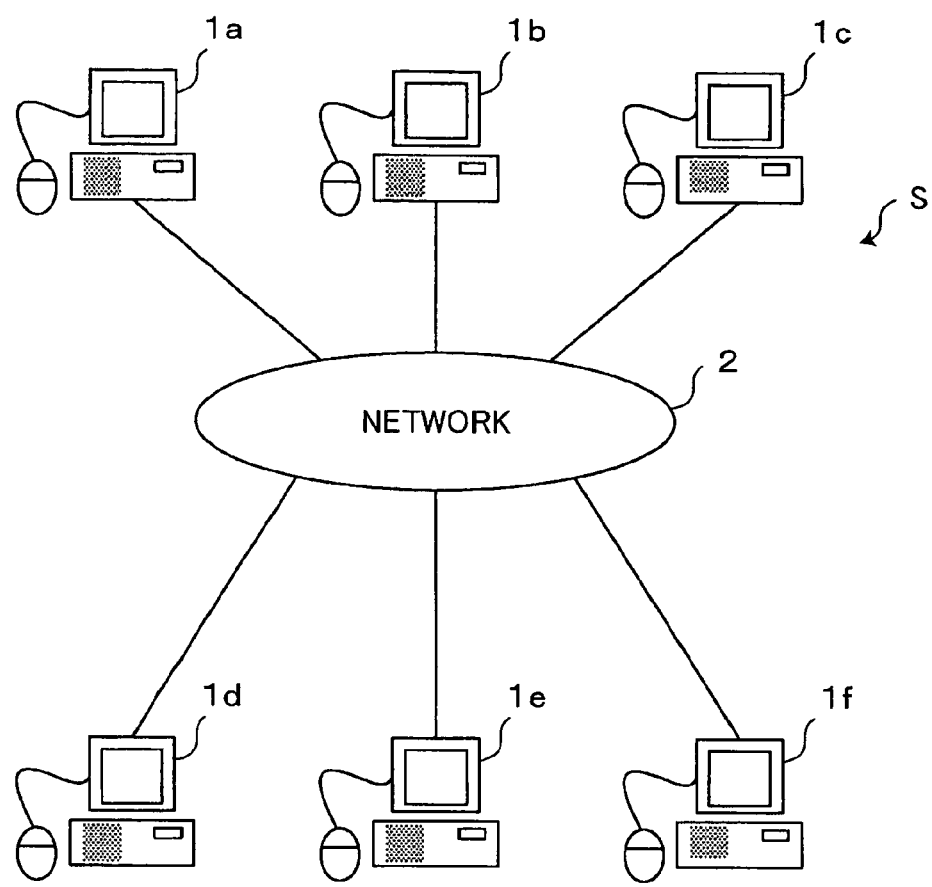
FIG. 1 is a view showing the schematic constitution of a communication system according to a first embodiment.

First of all, the summary of a communication system according to a first embodiment of the present invention is explained. FIG. 1 shows the schematic constitution of the communication system according to the first embodiment, FIG. 2 shows the schematic constitution of a terminal device of the communication system according to the first embodiment, and FIG. 3 and FIG. 4 explains the summary of time adjustment of the terminal device according to the first embodiment.

As shown in FIG. 1, the communication system S according to this embodiment includes a plurality of terminal devices 1a, 1b, 1c, 1d, 1e, 1f. These terminal devices 1a, 1b, 1c, 1d, 1e, 1f are communicably connected with each other via a network 2 such as the Internet. A plurality of content information (for example, music data, movie data, document data) is arranged in these terminal devices 1a, 1b, 1c, 1d, 1e, 1f in a distributed manner, and these content information is transmitted and received among the terminal devices 1a, 1b, 1c, 1d, 1e, 1f. That is, the communication system S is a P2P (peer to peer) type communication system. In the explanation made hereinafter, for the sake of convenience, "terminal device 1" is used for referring to any one of terminal devices 1a, 1b, 1c, 1d, 1e, 1f as well as for referring to all of these terminal devices.

Figure 2:
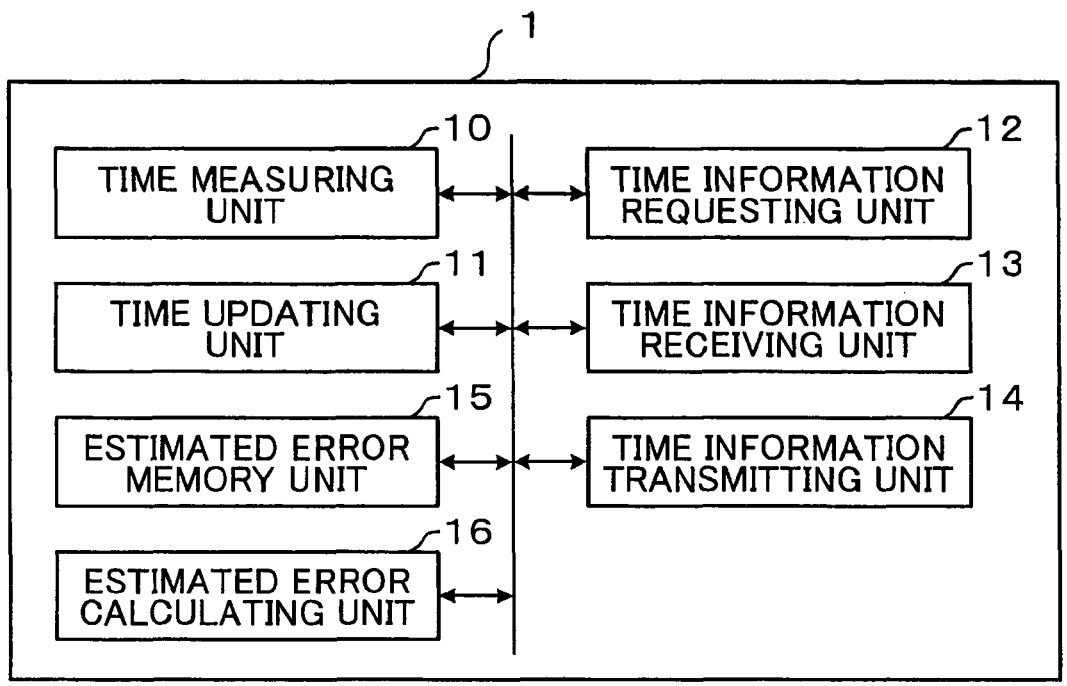
FIG. 2 is a view showing the schematic constitution of a terminal device of the communication system according to the first embodiment.

The terminal device 1 according to this embodiment includes, as shown in FIG. 2, a time measuring unit 10 which measures time, and a time updating unit 11 which adjusts measured time obtained by the time measuring unit 10.

Further, the terminal device 1 includes a time information requesting unit 12, a time information receiving unit 13, and a time information transmitting unit 14. Here, the time information requesting unit 12 requests the transmission of measured time and the like from another terminal device 1. The time information receiving unit 13 receives the measured time and the like transmitted from another terminal device 1 in response to the request made by the time information requesting unit 12. The time information transmitting unit 14 transmits the measured time measured by the time measuring unit 10 and the like in response to a request from another terminal device 1 to the another terminal device 1 which constitutes the request source.

Further, the time updating unit 11 is configured to adjust the measured time measured by the time measuring unit 10 based on the measured time measured by another terminal device 1 which is received by the time information receiving unit 13.

In this manner, each terminal device 1 adjusts the time measuring unit 10 of own device based on time information measured by the time measuring unit 10 of another terminal device 1. Accordingly, compared to a case in which each terminal device obtains reference time from a server device, the terminal device 1 according to this embodiment can acquire an advantageous effect that the concentration of traffic in the network 2 can be suppressed.

Figure 3:
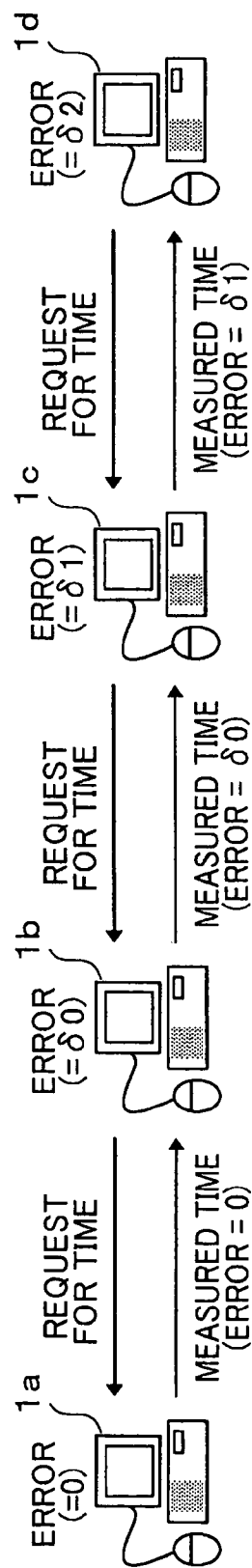
FIG. 3 is a view for explaining summary of time adjustment of the terminal device according to the first embodiment.

Here, for example, as shown in FIG. 3, assume a case in which the terminal device 1b obtains measured time from the terminal device 1a and adjusts the time measuring unit 10 of own device and, thereafter, the terminal device 1c obtains measured time from the terminal device 1b and adjusts the time measuring unit 10 of own device and, thereafter, the terminal device 1d obtains measured time from the terminal device 1c and adjusts the time measuring unit 10 of own device. In the communication system S of this embodiment, as a reference terminal device provided with a time measuring unit which measures time having no error with current time, at least one terminal device 1 is arranged. In the example shown in FIG. 3, the terminal device 1a is used as the reference terminal device.

When the terminal device 1b obtains the measured time from the terminal device 1a, a loss time attributed to transmission/reception processing between the terminal devices 1a, 1b and the transmission via the network 2 (hereinafter, referred to as "information transmission time") is generated. Accordingly, at a point of time that the terminal device 1b obtains the measured time from the terminal device 1a, an error is generated between the measured time and current time. When the terminal device 1c obtains the measured time with such an error, the error is increased due to the information transmission time between the terminal devices 1b and 1c. Further, when the terminal device 1d obtains the measured time with such an error, the error is further increased due to the information transmission time between the terminal devices 1c and 1d.

In this manner, in the terminal device 1, when the measured time of the reference terminal device is obtained via other terminal device, the larger the number of other interposed terminal devices, the error between the measured time obtained by the reference terminal device and current time is increased.

Accordingly, each terminal device 1 of this embodiment obtains the measured time from another terminal device 1 which has the measured time estimated to have a small error from current time thus suppressing the increase of the error of the measured time.

To determine another terminal device 1 which measures the time estimated to have the small error with current time, each terminal device 1 includes an estimated error memory unit 15 and an estimated error calculating unit 16.

The estimated error memory unit 15 is a memory unit which stores the estimated error between the measured time measured by the time measuring unit 10 and current time. This estimated error can be calculated by the estimated error calculating unit 16 at the time of obtaining the measured time from another terminal device 1 and the like. That is, the estimated error calculating unit 16 estimates the error between the measured time obtained by the time measuring unit and current time.

Here, the time adjustment by each terminal device 1 is performed as follows.

First of all, the time information requesting unit 12 requests another terminal device 1 to transmit the measured time and the estimated error of another terminal device 1 via the network 2. The time information requesting unit 12 performs this request periodically (for example, at 1 hour intervals) or at random. Further, the time information requesting unit 12 selects another terminal device 1 to be selected as the request destination from other terminal devices 1 which know the address information (for example, IP address) of other terminal devices 1 to be selected as the request destination in accordance with a predetermined rule or at random.

Then, another terminal device 1 which receives the request via the network 2 transmits the measured time measured by the time measuring unit 10 and the estimated error stored in the estimated error memory unit 15 to the terminal device 1 which constitutes the request source via the network 2.

Next, the time information receiving unit 13 receives the measured time and the estimated error of another terminal device 1 from another terminal device 1 to which the request is made from the time information requesting unit 12 via the network 2.

Then, the estimated error calculating unit 16 calculates an error containing the estimated error of another terminal device 1 received by the time information receiving unit 13 as an updating-use estimated error. Here, the estimated error calculating unit 16 calculates the updating-use estimated error by adding information transmission time between the own terminal device 1 and another terminal device 1 to the estimated error received by the time information receiving unit 13. The reason that the updating-use estimated error is calculated in this manner is that the measured time of another terminal device 1 received by the time information receiving unit 13 is deviated as an error by an amount corresponding to information transmission time in addition to the estimated error of another terminal device 1.

The estimated error calculating unit 16 performs the calculation of information transmission time such that time from a point of time that the time information requesting unit 12 requests another terminal device 1 to transmit the measured time to a point of time that the time information receiving unit 13 receives the measured time is determined, and this time is divided by 2.

Next, the time updating unit 11 determines whether or not the updating-use estimated error calculated by the estimated error calculating unit 16 is smaller than the estimated error stored in the estimated error memory unit 15.

Figure 4A:
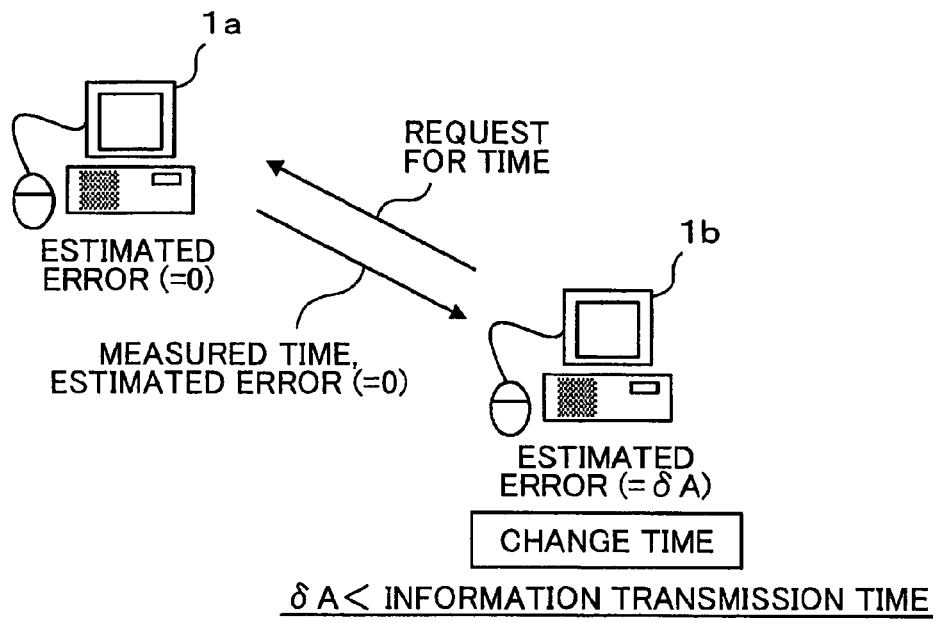
FIG. 4A and FIG. 4B are views for explaining summary of time adjustment of the terminal device according to the first embodiment.

Then, when it is determined that the updating-use estimated error is smaller than the estimated error stored in the estimated error memory unit 15, the time updating unit 11 allows the estimated error memory unit 15 to store the updating-use estimated error calculated by the estimated error calculating unit 16, and updates the estimated error stored in the estimated error memory unit 15. Further, the time updating unit 11 adjusts the measured time measured by the time measuring unit 10 in response to the measured time measured by another terminal device 1 received by the time information receiving unit 13. For example, as shown in FIG. 4A, when the updating-use estimated error which is obtained by adding information transmission time to the estimated error (=0) of the terminal device 1a which constitutes the reference terminal device is smaller than the estimated error (=δA) of the terminal device 1b, the terminal device 1b adjusts the measured time of the time measuring unit 10 to the measured time obtained from the terminal device 1a.

Here, the determination on whether or not "the updating-use estimated error is smaller than the estimated error stored in the estimated error memory unit 15" is not limited to a case in which the updating-use estimated error is smaller than the estimated error in a strict sense. For example, even when the updating-use estimated error is slightly larger than the estimated error, the time updating unit 11 may be set to make the determination that "the updating-use estimated error is smaller than the estimated error stored in the estimated error memory unit 15". Alternatively, when the updating-use estimated error is smaller than the estimated error by a fixed value or more, the time updating unit 11 may be set to make the determination that "the updating-use estimated error is smaller than the estimated error stored in the estimated error memory unit 15".

Figure 4B:
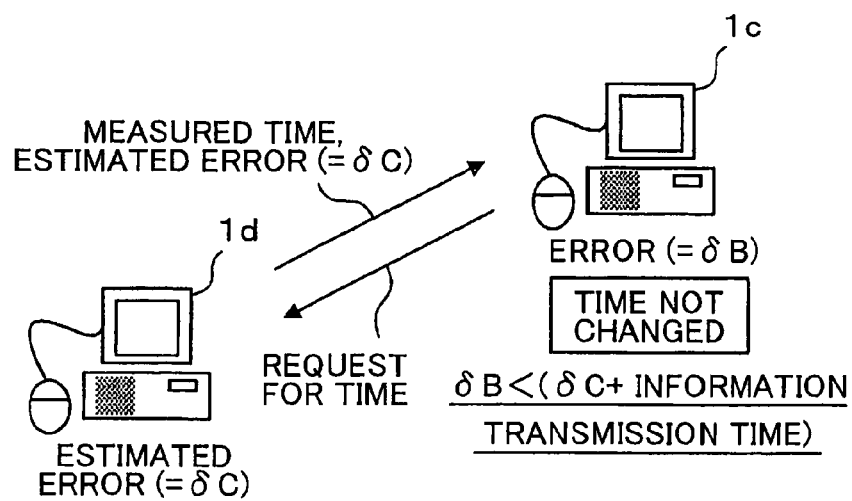

On the other hand, when it is determined that the updating-use estimated error is equal to or more than the estimated error stored in the estimated error memory unit 15, the time updating unit 11 does not perform updating of the estimated error memory unit 15 or the adjustment of the time measuring unit. For example, as shown in FIG. 4B, when the updating-use estimated error obtained by adding information transmission time to the estimated error (=δC) of the terminal device 1d is equal to or more than the estimated error (=δB) of the terminal device 1c, the terminal device 1c does not perform the adjustment of the measured time of the time measuring unit 10.

In this manner, the terminal device 1 of this embodiment is configured not to perform the adjustment of the measured time of the time measuring unit 10 when the estimated error with respect to the measured time obtained from another terminal device 1 (the error obtained by adding information transmission time to the estimated error obtained from another terminal device 1) is equal to or more than the estimated error with respect to the measured time of its own terminal device.

As a result, the adjustment of the measured time of the time measuring unit 10 is performed such that the updating-use estimated error becomes smaller than the estimated error stored in the estimated error memory unit 15 and hence, it is possible to perform the adjustment of time while suppressing lowering of accuracy of the measured time attributed to the time measuring unit 10 in the terminal device 1.

1.2. Specific Constitution and Manner of Operation of Terminal Device

Next, one example of the specific constitution and the operation of the terminal device 1 of the communication system S according to the first embodiment is explained in conjunction with drawings.

(Specific Constitution of Terminal Device 1)

First of all, the constitution of the terminal device 1 is explained. FIG. 5 shows the specific constitution of the terminal device 1 of the communication system S according to the first embodiment.

As the terminal device 1, a general-purpose personal computer may be used besides a dedicated computer. As shown in FIG. 5, the terminal device 1 is constituted of a peripheral equipment control chip 22, a keyboard 23, a mouse 24, a video chip 25, a display 26, a sound source chip 27, a speaker 28, a memory part 29, a communication part 30, a CPU (Central Processing Unit) 31 and the like. Here, the peripheral equipment control chip 22, the video chip 25, the sound source chip 27, the memory part 29, the communication part 30, the CPU 31 and the counting unit 32 are connected with each other via a system bus 33.

The peripheral equipment control chip 22 has a function of informing the CPU 31 of information which is inputted due to an operation of the keyboard 23 or the mouse 24 by a user. Further, the video chip 25 has a function of outputting content information or the like stored in the memory part 29 to the display 26 as image signals, and displaying an image corresponding to the content information on the display 26. Further, the sound source chip 27 has a function of outputting content information or the like stored in the memory part 29 to the speaker 28 as sound signals and generating sound corresponding to content information from the speaker 28.

The memory part 29 is a rewritable memory which stores various information, and is constituted of a hard disk drive, for example. The memory part 29 includes a memory region 40 which stores content information, a memory region 41 which stores an OS (Operating System) program, a memory region 42 which stores an information processing program and the like. Further, the memory part 29 includes a memory region 43 which stores time adjustment data such as the estimated error (reference error), the reference time, the reference count value, the transmission-time count value and the reception-time count value and hence, the memory part 29 functions as the estimated error memory unit, the reference time memory unit, the reference count value memory unit, the transmission-time count value memory unit, the reception-time count value memory unit and the like.

The communication part 30 is an interface for connecting the terminal device 1 to the network 2. The terminal device 1 can transmit information to another terminal device 1 through the communication part 30 via the network 2 and, at the same time, the terminal device 1 can receive information transmitted from another terminal device 1 through the communication part 30 via the network 2.

The CPU 31 functions as the time information requesting unit, the time information transmitting unit, the time information receiving unit, the estimated error calculating unit, the time updating unit, the time measuring unit and the like by reading out and executing the information processing program stored in the memory region 42 of the memory part 29.

The information processing program, for example, may be downloaded to the memory part 29 from a server (not shown in the drawing) connected to the network 2 via the communication part 30 or may be recorded in a recording medium such as a CD-ROM and may be read by the memory part 29 via a recording medium drive not shown in the drawing.

The counting unit 32 is a timer which increments one count value per unit time (for example, 1 ms). The counting unit 32 may be operated along with the execution of the OS program by the CPU 31.

Here, the above-mentioned time measuring unit is constituted of the memory part 29, the CPU 31 and the counting unit 32, and the time measuring unit measures a measured time Now (self). Time measuring processing of the time measuring unit is carried out by the CPU 31 which constitutes the time calculating unit using a following formula (1).

$$\text{Now(self)} = Tb + (Cx - Cb) \qquad (1)$$

In carrying out the calculation of the above-mentioned formula (1), the CPU 31 obtains time measured based on the OS program, and stores this time as the reference time Tb in the memory part 29. Further, the CPU 31 stores the count value C obtained from the counting unit 32 at timing measured using an OS program as the reference count value Cb in the memory part 29. Then, the CPU 31 subtracts the reference count value Cb from the present count value Cx counted by the counting unit 32, and sets a value obtained by adding a result of the calculation to the reference time Tb stored in the memory part 29 as the measured time Now (self).

(Specific Operation of Terminal Device 1)

Figure 6A:
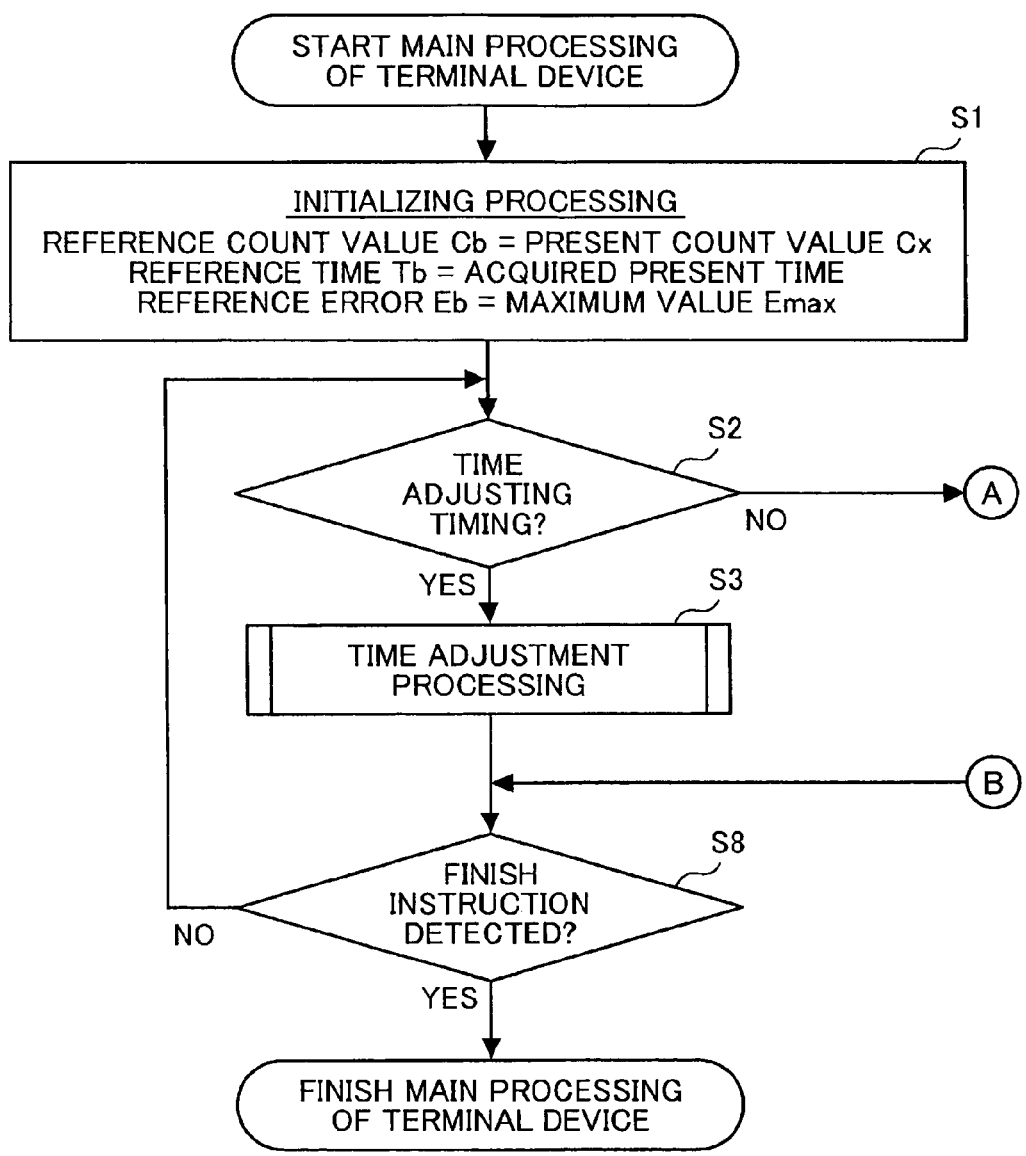
FIG. 6A and FIG. 6B are flowcharts of main processing of the terminal device according to the first embodiment.
Figure 6B:
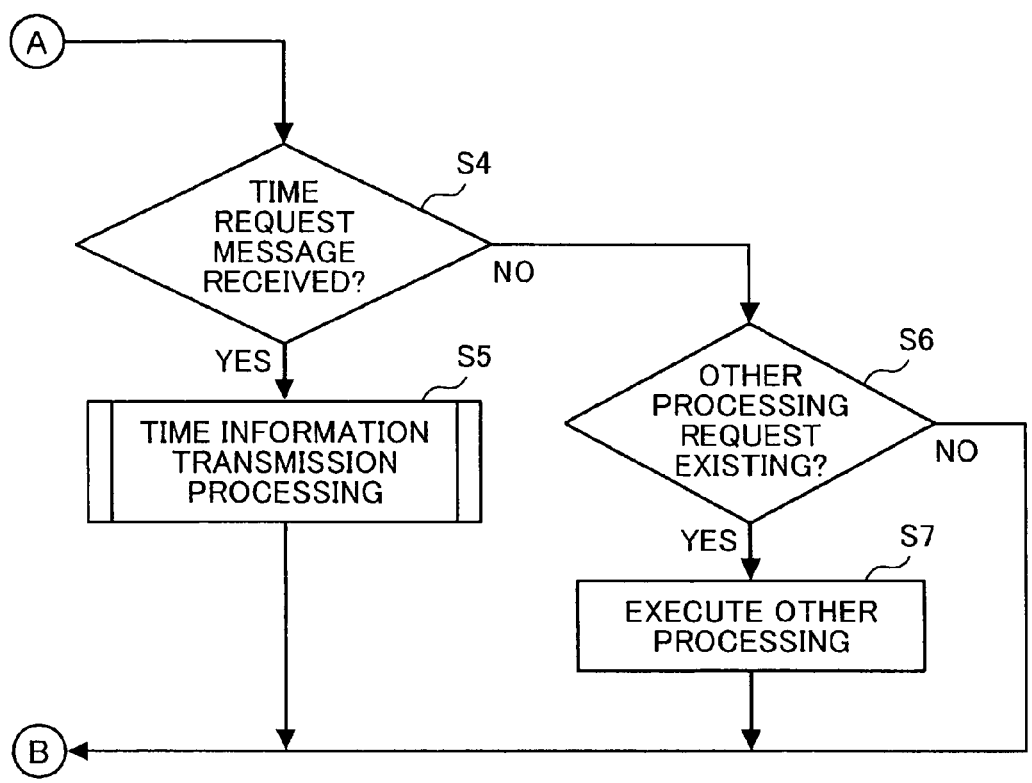

The operation of the terminal device 1 having the above-mentioned constitution is specifically explained in conjunction with drawings. FIG. 6 shows a main processing flowchart of the terminal device 1 according to the first embodiment. Respective processing explained hereinafter are executed by the CPU 31 of the terminal device 1 which performs various functions as the above-mentioned respective units and the like. Here, the operation of the parts which constitute technical features of the present invention are mainly explained, and some operation contents (for example, receiving/reproducing operation of content information or the like) are omitted.

As shown in FIG. 6, when a main power source switch (not shown in the drawing) of the terminal device 1 is turned on or a reset switch (not shown in the drawing) of the terminal device 1 is operated, the CPU 31 executes initializing processing. In this initializing processing, the CPU 31, after starting an OS by executing the OS program stored in the memory part 29, brings the information processing program into an executable state, and brings a function thereof as the control part into an operable state (step S1) thus performing time setting and, at the same time, participates in the communication system S so as to advance processing to step S2. Due to the participation in the communication system S, the terminal device 1 can perform the transmission/reception of content information between the terminal device 1 and another terminal device 1.

Here, the time setting by the CPU 31 is performed by setting the reference count value Cb, the reference time Tb and the reference error Eb in the memory part 29. To be more specific, the CPU 31 stores the time which the counting unit 32 currently measures at present in the memory part 29 as the reference count value Cb. Simultaneously, the CPU 31 obtains the time which is measured by the OS and stores the time in the memory part 29 as the reference time Tb. Further, the CPU 31 stores the maximum value Emax of the reference error preliminarily set in the memory part 29 as the reference error Eb. Here, this time setting is not executed when the reference count value Cb, the reference time Tb and the reference error Eb are already stored in the memory part 29. The time may not be obtained from the OS and may be obtained from an external server device (an NTP server device, for example) and the like via the communication part 30.

Next, the CPU 31 determines whether or not timing of time adjustment arrives or not (step S2). Timing of time adjustment arrives periodically (once in 1 hour, for example) thus realizing the periodical time adjustment. Here, timing of the time adjustment may be set at random.

In such processing, when it is determined that processing arrives at timing of time adjustment (step S2: Yes), the CPU 31 performs the time adjustment processing (step S3). This time adjustment processing is processing executed in step S10 to step S16 shown in FIG. 7 and is explained later.

On the other hand, when it is determined that processing does not arrive at timing of time adjustment (step S2: No), the CPU 31 determines whether or not the CPU 31 receives a time request message from another terminal device 1 via the network 2 and the communication part 30 (step S4).

In such processing, when it is determined that the CPU 31 receives a time request message from another terminal device 1 (step S4: Yes), the CPU 31 executes the time information transmission processing (step S5). This time information transmission processing is processing executed in step S20 and step S21 shown in FIG. 8 and is explained later.

On the other hand, when it is determined that the CPU 31 does not receive the time request message from another terminal device 1 (step S4: No), the CPU 31 determines whether or not other processing requests exist (step S6). In such processing, when it is determined that other processing request exists (step S6: Yes), the CPU 31 executes processing corresponding to the request (step S7).

When the processing in steps S3, S5 and S7 are finished or when it is determined that other processing requests do not exist (step S6: No), the CPU 31 determines whether or not the finish instruction is detected (step S8). For example, when a power source of the own terminal device 1 is shifted to an OFF state, the CPU 31 detects the finish instruction.

When it is determined that the finish instruction is detected in step S8 (Step S8: Yes), the CPU 31 finishes the main processing, while when it is determined that the finish instruction is not detected in step S8 (Step S8: No), the CPU 31 repeats a series of processing starting from processing in step S2.

Figure 7:
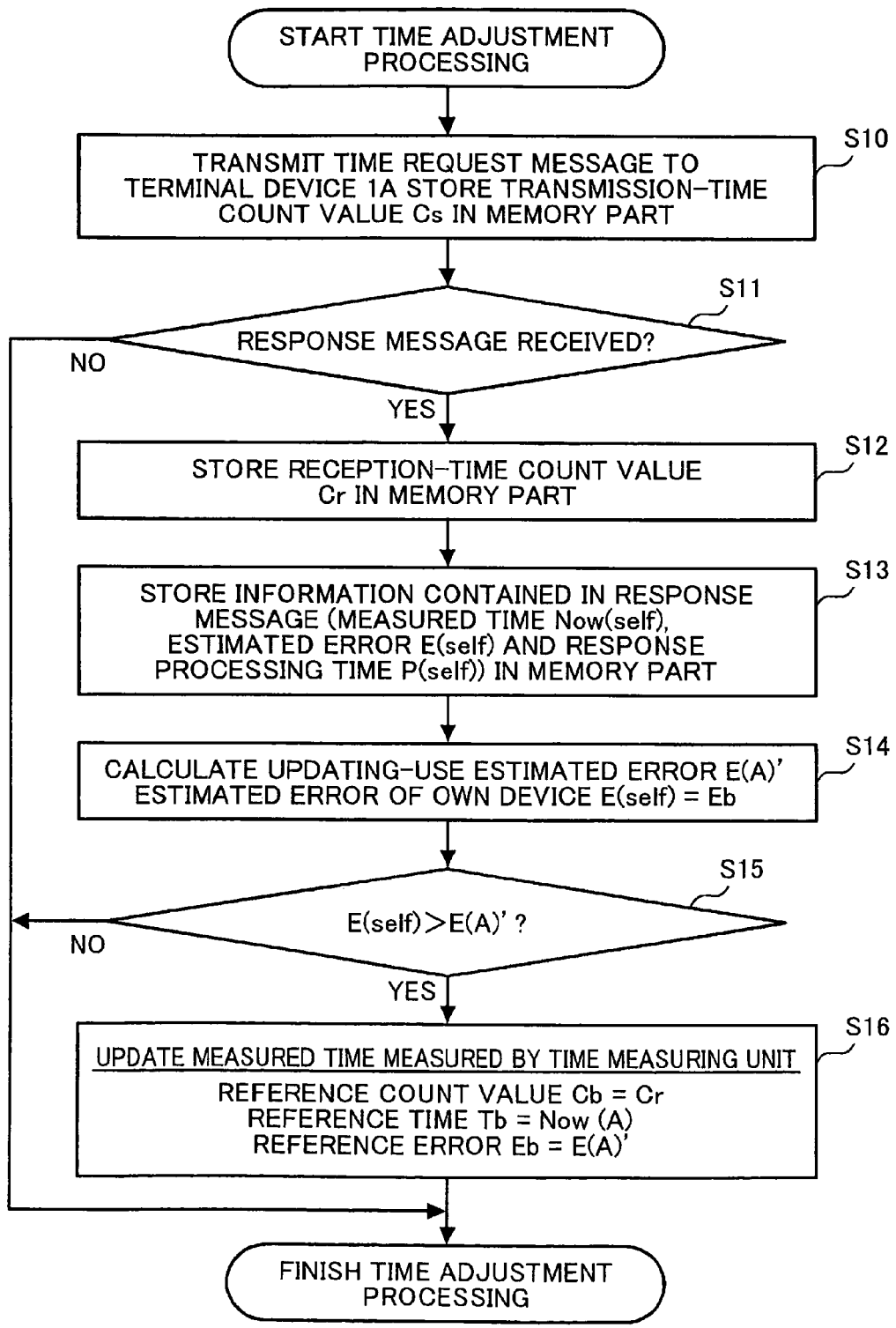
FIG. 7 is a flowchart of time adjustment processing in the terminal device according to the first embodiment.

Next, the time adjustment processing in step S3 is specifically explained in conjunction with the flowchart shown in FIG. 7. FIG. 7 shows the flowchart of the time adjustment processing in the terminal device 1 according to the first embodiment.

As shown in FIG. 7, when time adjustment processing starts, the CPU 31 transmits a time request message which requests a measured time and an estimated error to another terminal device 1 (hereinafter, refereed to as "terminal device 1A") via the communication part 30 and the network 2. Further, the CPU 31 stores a count value (Tick number) of the counting unit 32 when the time request message is transmitted in the memory part 29 (one example of the first count memory unit) as a transmission-time count value Cs (one example of a first count value) (step S10). The terminal device 1A which constitutes the transmission destination of the time request message is selected at random out of a plurality of terminal devices 1 by the CPU 31. In this manner, the CPU 31 functions as a time information requesting unit which requests another terminal device 1 to transmit the measured time and the estimated error of another terminal device 1.

Next, the CPU 31 determines whether or not a response message to the time request message is received from the terminal device 1A via the communication part 30 and the network 2 within a predetermined period after finishing of processing in step S10 (step S11). Here, the CPU 31 functions as the time information receiving unit which receives the response message to the time request message from the terminal device 1A via the communication part 30 and the network 2.

When it is determined that response message is received from the terminal device 1A in this processing (step S11: Yes), the CPU 31 stores a count value of the counting unit 32 when the response message is received in the memory part 29 (one example of the second count memory unit) as a reception-time count value Cr (one example of second count value) (step S12).

Further, the CPU 31 stores information contained in the received response message in the memory part 29 (step S13). As the information contained in the response message, a measured time Now (A) of the time measuring unit of the terminal device 1A, an estimated error E (A) of the measured time Now (A), a response processing time P (A) of the terminal device 1A and the like are named. As described later, the CPU 31 generates a measured time Now (self) measured by the time measuring unit, an estimated error E (self) and a response processing time P (self), wherein the measured time Now (A), the estimated error E (A) and the response processing time P (A) imply the measured time Now (self), the estimated error E (self) and the response processing time P (self) of the terminal device 1A.

Thereafter, the CPU 31 calculates an updating-use estimated error E (A)' using a following formula (2).

$$E(A')=E(A)+\{(Cr-Cs)-P(A)/2\} \quad (2)$$

In calculating the updating-use estimated error E (A)' using the above-mentioned formula (2), the CPU 31 reads out the reception-time count value Cr and the transmission-time count value Cs from the memory part 29. Then, the CPU 31 subtracts the transmission-time count value Cs from the reception-time count value Cr, and a value which is obtained by dividing the response processing time P (A) by 2 is subtracted from such a value thus calculating an information transmission time $\{(Cr-Cs)-P(A)/2\}$ between its own terminal device 1 and the terminal device 1A, and the updating-use estimated error E (A)' is calculated by adding the estimated error E (A) of the terminal device 1A to a result of this calculation. In this manner, the CPU 31 functions as the estimated error calculating unit which calculates the error containing the received estimated error E (A) of the terminal device 1A as the updating-use estimated error E (A)'. Particularly, the CPU 31 calculates, as the estimated error calculating unit, the updating-use estimated error E (A)' by adding the information transmission time between the terminal device 1 and the terminal device 1A to the estimated error E (A) contained in the received response message. This updating-use estimated error E (A)' becomes an estimated error with respect to time measured by the time measuring unit when the time measuring unit is updated with the measured time Now (A) contained in the response message.

Further, the CPU 31 sets the reference error Eb stored in the memory part 29 as the estimated error E (self) (step S14).

Next, the CPU 31 determines whether or not the updating-use estimated error E (A)' is smaller than the estimated error E (self) (step S15). In other words, the CPU 31 determines, in this processing, whether or not the estimated error when the time of the time measuring unit is adjusted to the measured time Now (A) of the terminal device 1A is smaller than the estimated error E (self) of the current measured time Now (self) measured by the time measuring unit.

When it is determined that the updating-use estimated error E (A)' is smaller than the reference error Eb which is the estimated error stored in the estimated error memory unit 15 in this processing (step S15: Yes), the CPU 31 executes processing for adjusting the measured time of the time measuring unit of the own terminal device 1 (step S16).

To be more specific, the CPU 31 sets the reference count value Cb stored in the memory part 29 to the reception-time count value Cr thus updating the reference count value Cb stored in the memory part 29. Further, the CPU 31 stores the measured time Now (A) of the terminal device 1A contained in the response message as the reference time Tb in the memory part 29, and updates the reference time Tb stored in the memory part 29.

Here, the estimated error of the measured time Now (A) at a point of time that the CPU 31 receives is the updating-use estimated error E (A)', and this estimated error is smaller than the estimated error of the measured time Now (self) measured by the time measuring unit before adjustment (the reference error Eb stored in the estimated error memory unit 15). Accordingly, by updating the measured time of the time measuring unit in this manner, it is possible to enhance the accuracy of the measured time. Here, the measured time Now (self) of the time measuring unit is derived from the calculation of the above-mentioned formula (1) executed by the CPU 31.

The CPU 31 updates the reference error Eb stored in the memory part 29 as the updating-use estimated error E (A)'. This updating-use estimated error E (A)' is the estimated error of the measured time Now (A) at a point of time that the CPU 31 receives and is used when the time measuring unit performs the time adjustment next time. Accordingly, it is possible to enhance accuracy of the measured time Now (self) of the time measuring unit by periodically performing the time information adjustment processing.

In this manner, the CPU 31, when the updating-use estimated error E (A)' calculated by the estimated error calculating unit 16 is smaller than the estimated error (=reference error Eb) stored in the estimated error memory unit 15, functions as the time updating unit. That is, the CPU 31 stores the updating-use estimated error E (A)' in the estimated error memory unit 15, updates the reference error Eb stored in the estimated error memory unit 15, and adjusts the measured time measured by the time measuring unit corresponding to the measured time of the terminal device 1A received from the terminal device 1A.

Figure 8:
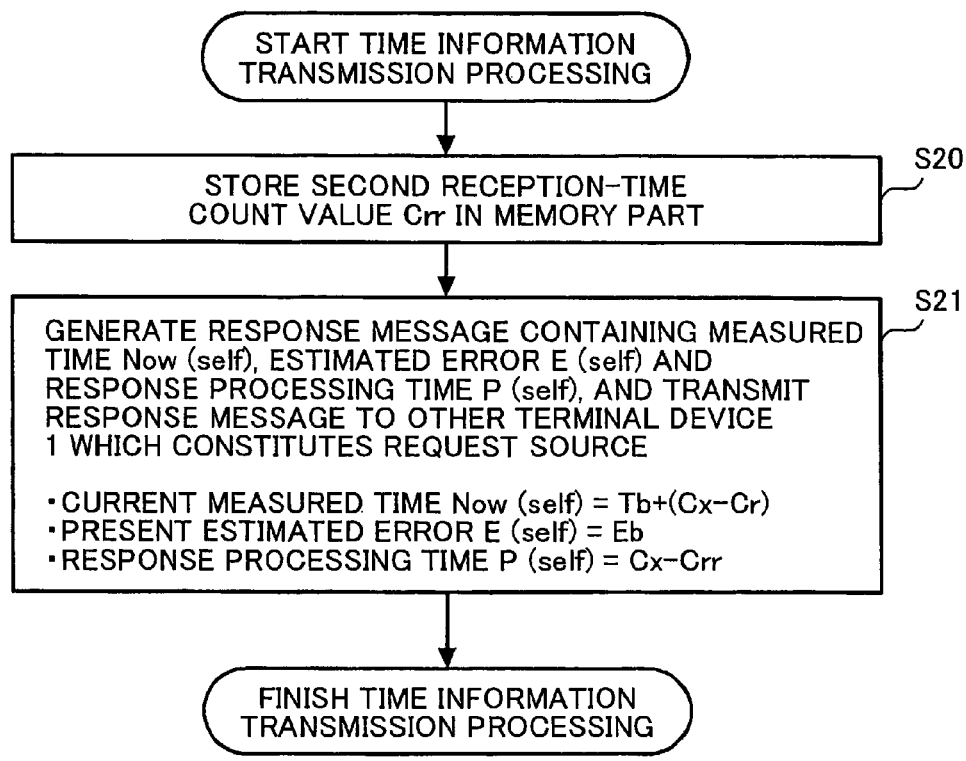
FIG. 8 is a flowchart of time information transmission processing in the terminal device according to the first embodiment.

Next, time information transmission processing in step S5 is specifically explained by reference to a flowchart shown in FIG. 8. FIG. 8 is a flowchart of the time information transmission processing in the terminal device 1 according to the first embodiment.

As shown in FIG. 8, when the time information transmission processing starts, the CPU 31 stores the count value of the counting unit 32 as a second reception-time count value Crr in the memory part 29 (step S20).

Next, the CPU 31 generates a response message corresponding to the time request message generated when it is determined that the terminal device 1 receives the time request message from another terminal device 1 in step S4, and transmits the response message to another terminal device 1 which is the transmission source of the time request message via the communication part 30 and the network 2 (step S21). To be more specific, the CPU 31 generates the response message which contains information of the current measured time Now (self) measured by the time measuring unit, the estimated error E (self) of the current measured time Now (self) and the response processing time P (self) respectively. Here, the CPU 31 calculates measured time Now (self) using the above-mentioned formula (1), takes out the reference error Eb from the memory part 29, and sets the reference error Eb as the estimated error E (self).

Further, the CPU 31 calculates the response processing time P (self) using a following formula (3).

$$P(\text{self}) = Cx - Crr \quad (3)$$

In calculating the response processing time P (self) using the above-mentioned formula (3), the CPU 31 takes out the second-reception-time count value Crr from the memory part 29 and subtracts the second-reception-time count value Crr from the present count value Cx of the counting unit 32 thus calculating the response processing time P (self). The response processing time P (self) is a lapsed time from a point of time that the time request message is received to a point of time that response message is transmitted.

In this manner, the CPU 31 functions as the time information transmitting unit which generates the current measured time Now (self), the estimated error E (self) of the current measured time Now (self) and the response processing time P (self), generates the response message which contains these information, and transmits the response message to another terminal device 1 which constitutes the transmission source of the time request message.

As described above, according to the terminal device 1 of the first embodiment, the terminal device having the time measuring unit can adjust the time measuring unit of its own terminal device based on the measured time measured by the time measuring unit of another terminal device and hence, it is possible to suppress the concentration of traffic in the network compared to a case where the respective terminal devices acquire the reference time from the server.

Further, when the estimated error with respect to the measured time obtained from another terminal device 1 is equal to or more than the estimated error with respect to the measured time of its own terminal device, the adjustment of the measured time of the time measuring unit is not performed so that it is possible to perform the time adjustment while suppressing lowering of accuracy of measured time measured by the time measuring unit of its own terminal device.

2. Second Embodiment

Next, the communication system according to the second embodiment is explained in conjunction with drawings.

The communication system according to the second embodiment is configured such that the estimated error is increased corresponding to a lapsed time from the time adjustment performed by the time measuring unit in each terminal device. This is because that the longer the period in which the time adjustment is not performed, the larger the measured time error of the time measuring unit becomes and hence, the accuracy of the estimated error can be enhanced by taking the measured time error into consideration. This embodiment differs from the first embodiment only with respect to an estimated error calculating unit 16 and an information processing program which is stored in a memory part 29 and hence, the explanation of the constitution of the terminal device is omitted while giving same symbols to parts identical to the parts of the first embodiment.

Figure 9:
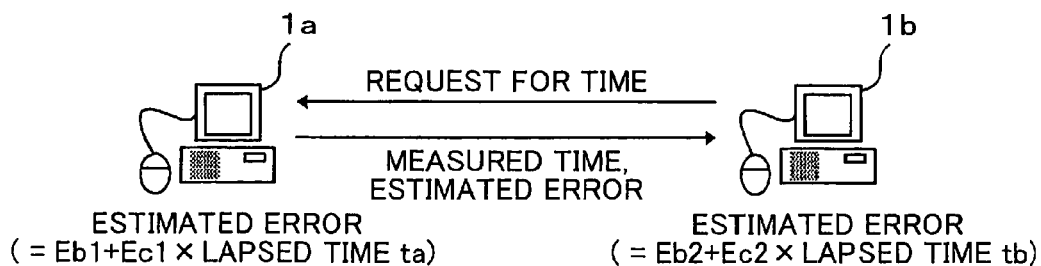
FIG. 9 is a view for explaining summary of time adjustment of a terminal device according to a second embodiment.

The summary of the time adjustment of the terminal device 1 according to the second embodiment is explained in conjunction with drawings. FIG. 9 is a view for explaining the summary of the time adjustment of the terminal device 1 according to the second embodiment.

As shown in FIG. 9, assume that a terminal device 1a receives a time request message from a terminal device 1b. Here, the terminal device 1a sets a value which is acquired by multiplying a lapsed time ta from a point of time that a reference error Eb is finally stored in an estimated error memory unit 15 with a predetermined error coefficient Ec and by adding a result of this calculation to the reference error Eb stored in the estimated error memory unit 15 as an estimated error E (self). A response message which contains the estimated error E (self) obtained by such calculation is transmitted to the terminal device 1b.

Due to such processing, even when the lapsed time ta from a point of time that the reference error Eb is finally stored in the estimated error memory unit 15 is long so that an error of measured time measured by a time measuring unit 10 (hereinafter, also referred to as "lapsed-time error") is increased, it is possible to inform another terminal device 1 which constitutes a transmission source of a time request message of the estimated error E (self) which takes the increased error into consideration. Accordingly, the adjustment of the measured time measured by the time measuring unit can be accurately performed.

For example, assume the reference errors Eb which the terminal devices 1a, 1b store in the estimated error memory units 15 of its own terminal devices respectively as Eb1, Eb2, the lapsed times from a point of time that the reference errors Eb1, Eb2 are stored as lapsed times ta, tb respectively, and an information transmission time from the terminal device 1a to the terminal device 1b as Ed.

Then, when the terminal device 1a receives a time request message from the terminal device 1b, the estimated error calculating unit 16 of the terminal device 1a calculates a lapsed-time error by multiplying a preset error coefficient Ec1 with the lapsed time ta and adds the reference error Eb1 to a result of calculation, and contains a result of addition in the response message as the estimated error E (self).

When the terminal device 1b receives a response message from the terminal device 1a, the estimated error calculating unit 16 of the terminal device 1b multiplies a preset error coefficient Ec2 with the lapsed time ta, and adds the reference error Eb2 stored in the estimated error memory unit 15 to a result of the calculation thus acquiring the estimated error E (self).

Then, a time updating unit 11 of the terminal device 1b determines whether or not an updated estimated error E(A)' which is obtained by adding information transmission time to the estimated error E (self) of the terminal device 1a contained in the response message is smaller than the estimated error E (self) calculated by the estimated error calculating unit 16 of its own terminal device.

When it is determined that the updated estimated error E(A)' is smaller than the estimated error E (self) calculated by the estimated error calculating unit 16 of its own terminal device, the time updating unit 11 of the terminal device 1b adjusts the measured time measured by the time measuring unit 10 to the measured time Now (self) of the terminal device 1a contained in the response message.

In this manner, according to the terminal device 1 of the second embodiment, by taking the lapsed time from a point of time that the reference error Eb is finally stored in the estimated error memory unit 15 into consideration, the adjustment of the measured time measured by the time measuring unit 10 can be performed with more accuracy.

(Specific Operation of Terminal Device 1)

Figure 10A:
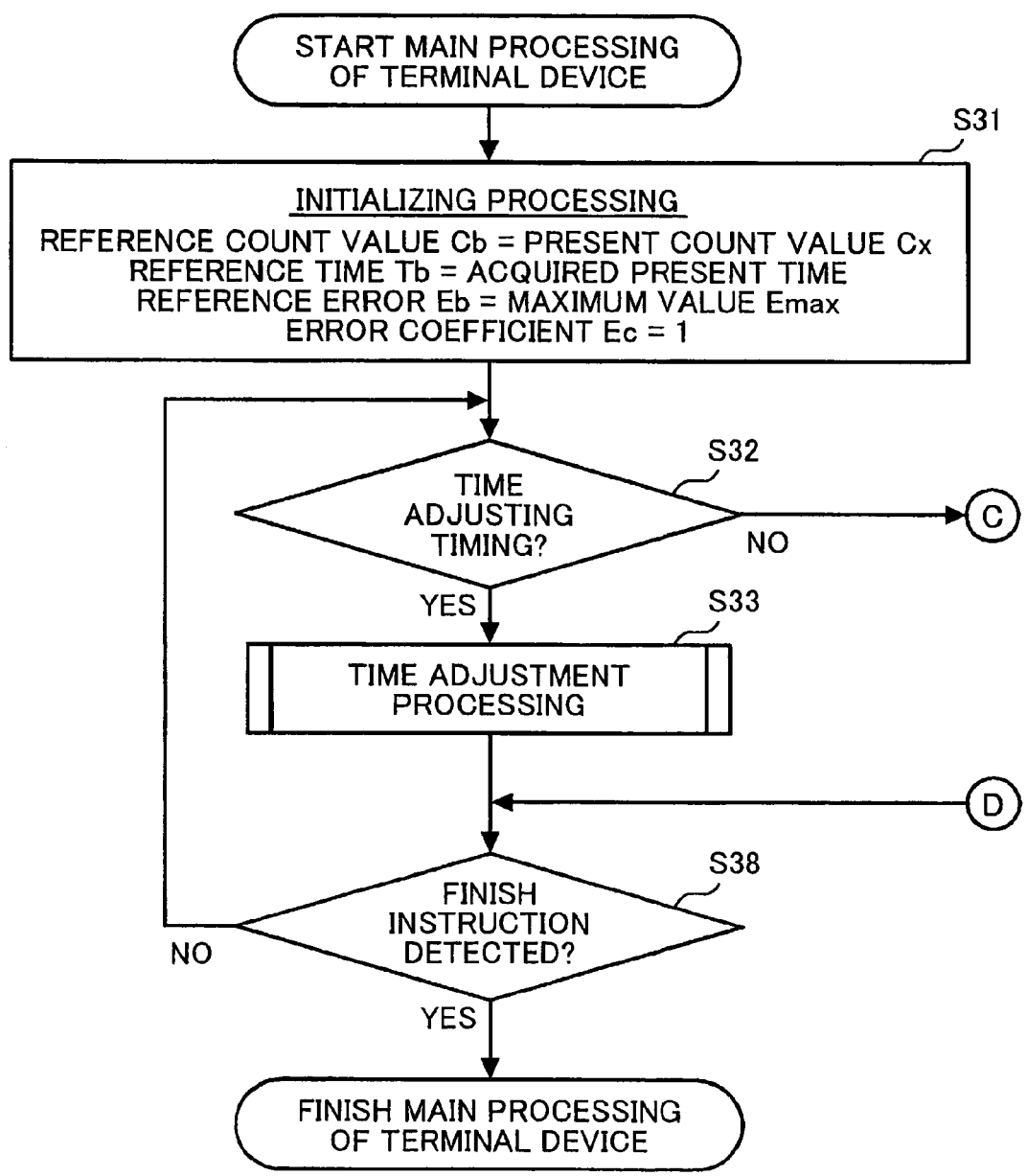
FIG. 10A and FIG. 10B are flowcharts of main processing of the terminal device according to the second embodiment.
Figure 10B:
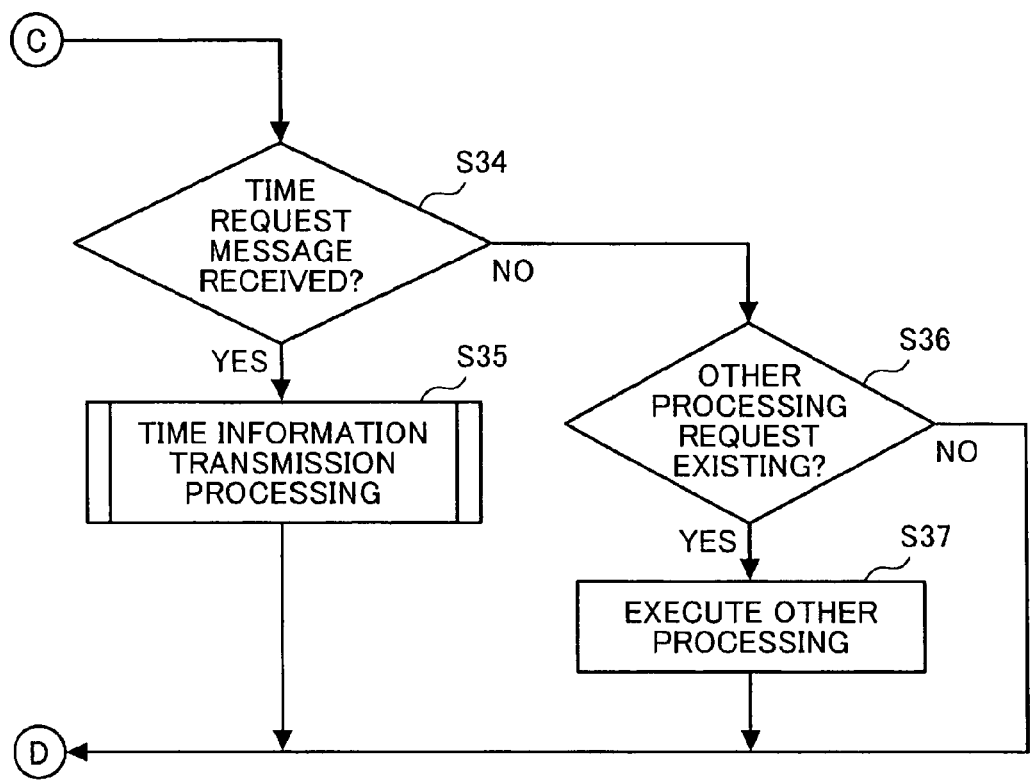

Next, one example of a specific operation of the terminal device 1 according to the second embodiment is explained in conjunction with drawings. FIG. 10 is a main processing flowchart of the terminal device 1 according to the second embodiment, FIG. 11 is a flowchart of time adjustment processing in the terminal device 1 according to the second embodiment, and FIG. 12 is a flowchart of time information transmission processing in the terminal device 1 according to the second embodiment.

As shown in FIG. 10, when main processing starts, the CPU 31 of the terminal device 1 executes time setting in initializing processing (step S31). The time setting is executed by setting an error coefficient Ec in the memory part 29 in addition to setting of a reference count value Cb, a reference time Tb and a reference error Eb in the memory part 29. Setting of the error coefficient Ec in the memory part 29 is performed such that the CPU 31 stores a maximum value "1" of an error coefficient which is preset in the memory part 29 in the memory part 29 as the error coefficient Ec. Setting of the reference count value Cb, the reference time Tb and the reference error Eb in the memory part 29 is substantially equal to the corresponding setting in the first embodiment. Further, processing in steps S32 to S38 is also substantially equal to the processing of the first embodiment (steps S2 to S8 in FIG. 6).

In this manner, in the initializing processing, the maximum value "1" of the error coefficient is set as the error coefficient Ec.

Figure 11:
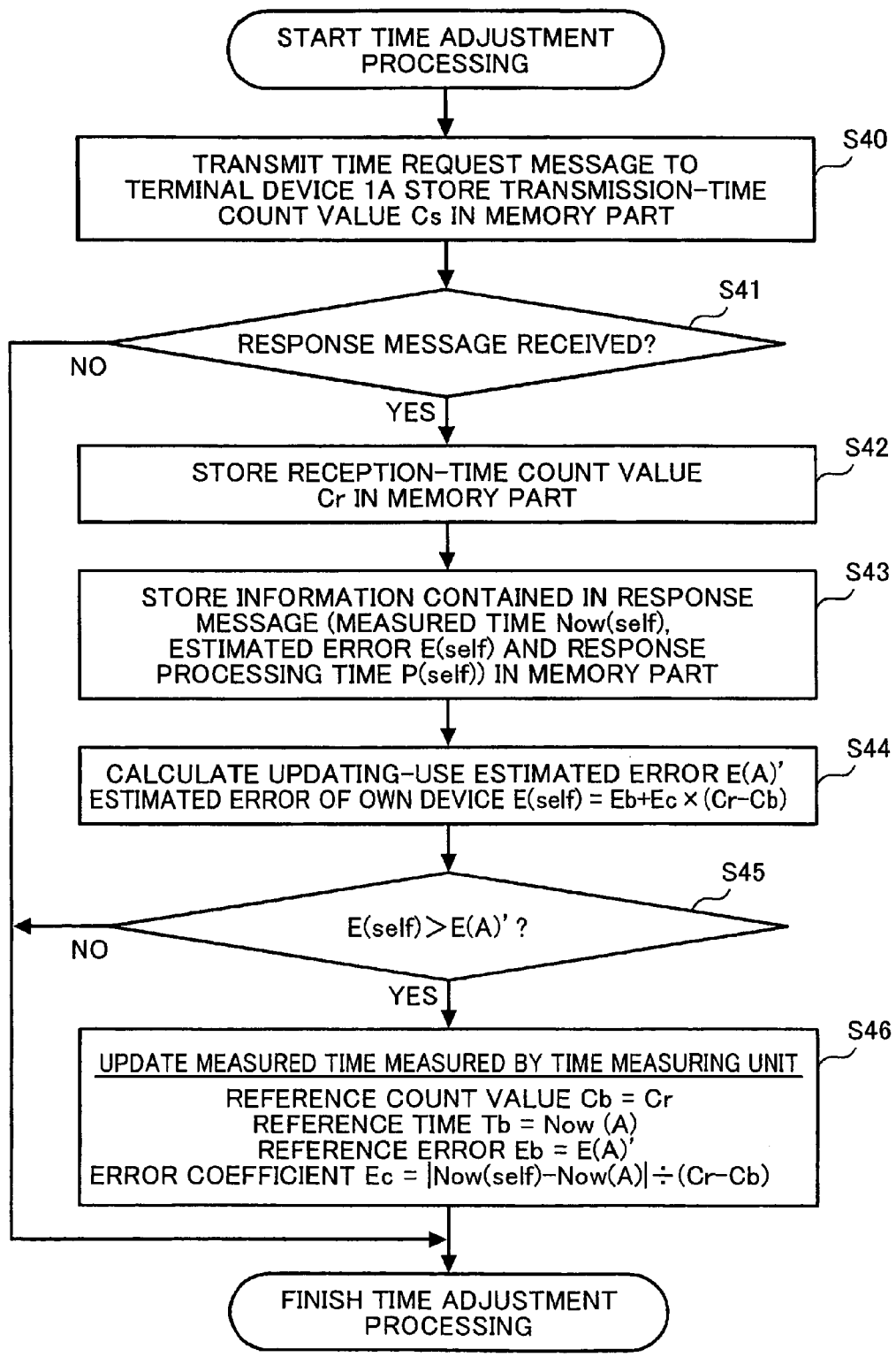
FIG. 11 is a flowchart of time adjustment processing in the terminal device according to the second embodiment.
Figure 12:
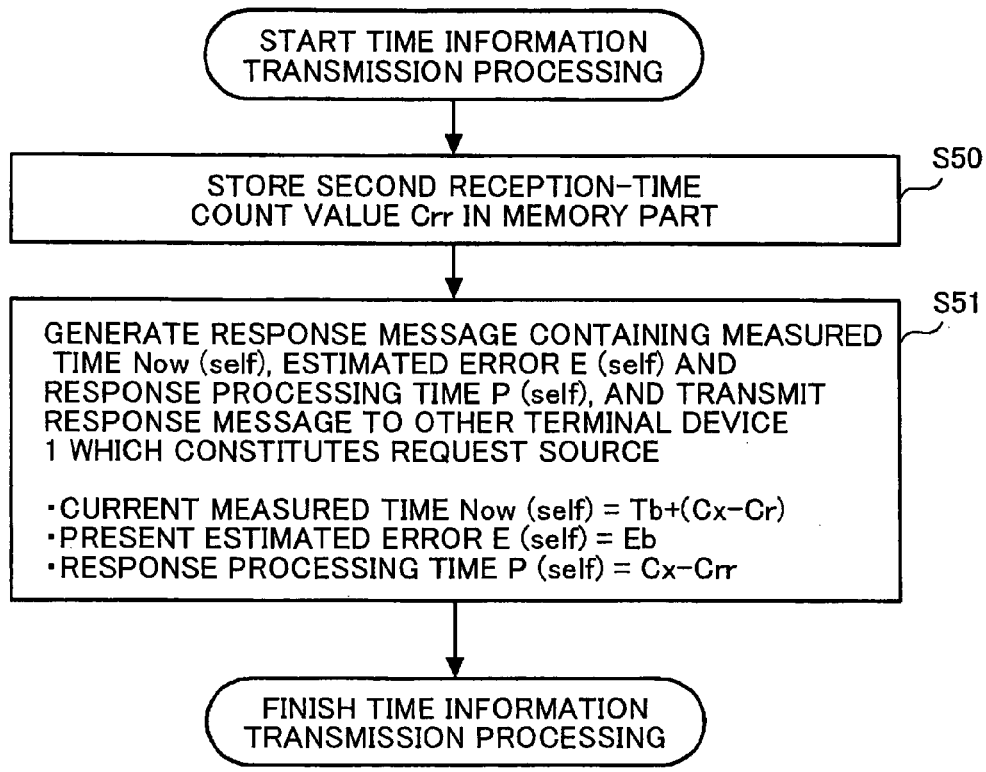
FIG. 12 is a flowchart of time information transmission processing in the terminal device according to the second embodiment.

The time adjustment processing of the terminal device 1 according to the second embodiment is constituted of processing in steps S40 to S46 shown in FIG. 11. Here, steps S40 to S43 and step S45 are substantially equal to processing of the first embodiment (steps S10 to S13, step S15 in FIG. 7) and hence, processing in step S44 and processing in step S46 are explained here.

In step S44, the CPU 31 calculates an estimated error E (self) using a following formula (4).

$$E(\text{self}) = Eb + Ec \times (Cr - Cb) \quad (4)$$

In calculating the estimated error E (self) using the above-mentioned formula (4), the CPU 31 reads out the reference error Eb and the error coefficient Ec from the memory part 29. Then, the CPU 31 subtracts a reference count value Cb from a reception-time count value Cr stored in the memory part 29 thus calculating a lapsed time t from a point of time that the reference error Eb which is the estimated error E (self) is finally stored in the memory part 29. Then, the CPU 31 sets a value obtained by adding a lapsed-time error which is a value obtained by multiplying the error coefficient Ec with the lapsed time t to the reference error Eb as the estimated error E (self). Further, the CPU 31 calculates an updating-use estimated error E (A)' in the same manner as the first embodiment.

In this manner, the terminal device 1 calculates the estimated error E (self) of its own terminal device by taking the lapsed time from a point of time that the measured time measured by the time measuring unit is finally adjusted into consideration and, at the same time, the terminal device 1 takes this lapsed time into consideration in the same manner as the estimated error E (A) which is obtained from the terminal device 1A. Accordingly, the reliability of the estimated error E (self) of the time measuring unit of its own terminal device and the reliability of the estimated error E (A) of the time measuring unit of the terminal device 1A are enhanced. Accordingly, it is possible to perform the time adjustment while suppressing lowering of accuracy of the measured time measured by the time measuring unit of the terminal device 1 more effectively.

Further, in step S46, the CPU 31 calculates an error coefficient Ec using a following formula (5).

$$Ec = |\text{Now}(\text{self}) - \text{Now}(A)| \div (Cr - Cb) \quad (5)$$

In calculating the error coefficient Ec using the above-mentioned formula (5), the CPU 31 calculates the difference between a measured time Now (self) measured by the time measuring unit of its own terminal device and a measured time Now (A) of the terminal device 1A, and stores a value obtained by dividing a result of the calculation with the lapsed time t(=Cr−Cb) in the memory part 29 as the error coefficient Ec.

By updating the error coefficient Ec in such a manner, the larger an amount of displacement of measured time which the time measuring unit exhibits in a short period, the larger the error coefficient Ec of the time measuring unit becomes and hence, the reliability of the estimated error E (self) can be enhanced.

Time information transmission processing of the terminal device 1 according to the second embodiment is constituted of processing in steps S50 and S51 shown in FIG. 12. Since processing in step S50 is substantially equal to processing in step S20 of the first embodiment shown in FIG. 8, processing of step S51 is explained here.

In step S51, the CPU 31 generates a response message which contains respective information on a measured time Now (self), an estimated error E (self) of a current measured time and a response processing time P (self), and transmits the response message to another terminal device 1 which constitutes a transmission source of a time request message via a communication part 30 and a network 2.

Here, the CPU 31 calculates the estimated error E (self) using the above-mentioned formula (4).

That is, the CPU 31 reads out the reference error Eb and the error coefficient Ec from the memory part 29, and sets a value obtained by adding the reference error Eb to a value obtained by multiplying the error coefficient Ec with the lapsed time t(=Cr−Cb) as the estimated error E (self).

The measured time Now (self) and the response processing time P (self) are calculated in the same manner as the first embodiment.

By calculating the error coefficient in such a manner, it is possible to enhance the accuracy of the estimated error by taking measured time error of the time measuring unit per se into consideration. Accordingly, the adjustment of the measured time of the time measuring unit can be performed with more accuracy.

3. Third Embodiment

Next, a communication system according to the third embodiment is explained in conjunction with drawings.

In the above-mentioned first and second embodiments, when a terminal device exhibits a small estimated error in spite of the fact that a measured time of a time measuring unit is largely displaced from actual time, there exists a possibility that the time measuring unit is adjusted based on a measured time acquired from the terminal device 1. For example, when the measured time measured by the time measuring unit is largely displaced from the actual time intentionally and, at the same time, a terminal device 1 having a small estimated error is purposely arranged in a communication system S, measured times measured by time measuring units of a plurality of terminal devices 1 within the communication system S are largely displaced from the actual time. The communication system S is a P2P-type communication system and hence, it is difficult to completely eliminate such a malicious terminal device.

Accordingly, the communication system according to the third embodiment is configured to increase the estimated error after adjustment when the difference between the measured times measured by the time measuring unit before and after the adjustment is large by reflecting such difference on the estimated error in each terminal device. This embodiment differs from the first embodiment only with respect to an estimated error calculating unit 16 and an information processing program which is stored in the memory part 29 and hence, the explanation of the constitution of the terminal device is omitted while giving same symbols to parts identical to the parts of the first embodiment.

Figure 13:
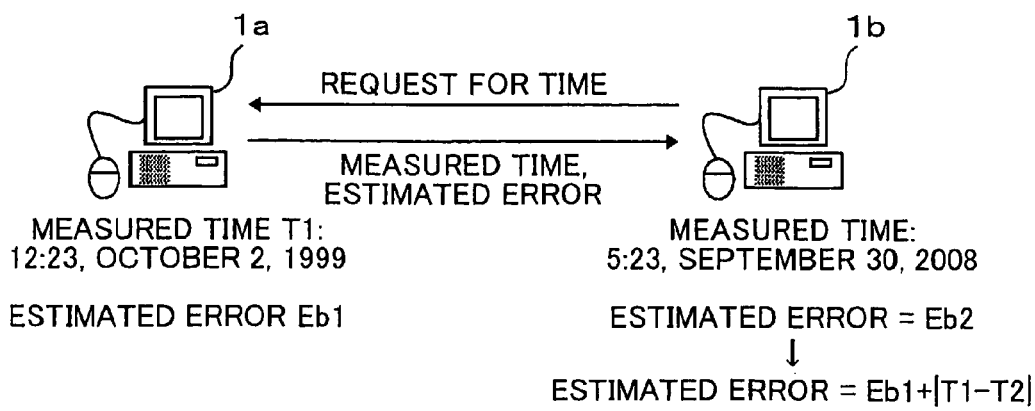
FIG. 13 is a view for explaining summary of time adjustment of a terminal device according to a third embodiment.

The summary of time adjustment of the terminal device 1 according to the third embodiment is explained in conjunction with drawings. FIG. 13 is a view for explaining the summary of the time adjustment of the terminal device 1 according to the third embodiment.

As shown in FIG. 13, assume that a terminal device 1a receives a time request message from a terminal device 1b. Here, the terminal device 1a transmits a response message containing measured time T1 and an estimated error E (self) =Eb1 to the terminal device 1b.

When the terminal device 1b receives the response message from the terminal device 1a, an estimated error calculating unit 16 of the terminal device 1b takes out the measured time T1 of the terminal device 1a from the response message. Then, the estimated error calculating unit 16 of the terminal device 1b acquires a measured time T2 measured by a time measuring unit 10 of its own terminal device, and calculates the difference |T1−T2| between the measured time T2 and the measured time T1 of the terminal device 1a. Further, the estimated error calculating unit 16 reads out the reference error Eb from an estimated error memory unit 15. Then, the estimated error calculating unit 16 sets a value obtained by adding the difference |T1−T2| to the reference error Eb as an estimated error E (self). The estimated error E (self) which is calculated in this manner is stored in the estimated error memory unit 15 by the estimated error calculating unit 16 as the reference error Eb.

In this manner, in the terminal device 1 of the third embodiment, by reflecting the difference between the measured times measured by the time measuring unit 10 before and after the adjustment on the estimated error E (self), the estimated error E (self) after adjustment can be increased when the difference is large.

(Specific Operation of Terminal Device 1)

Figure 14:
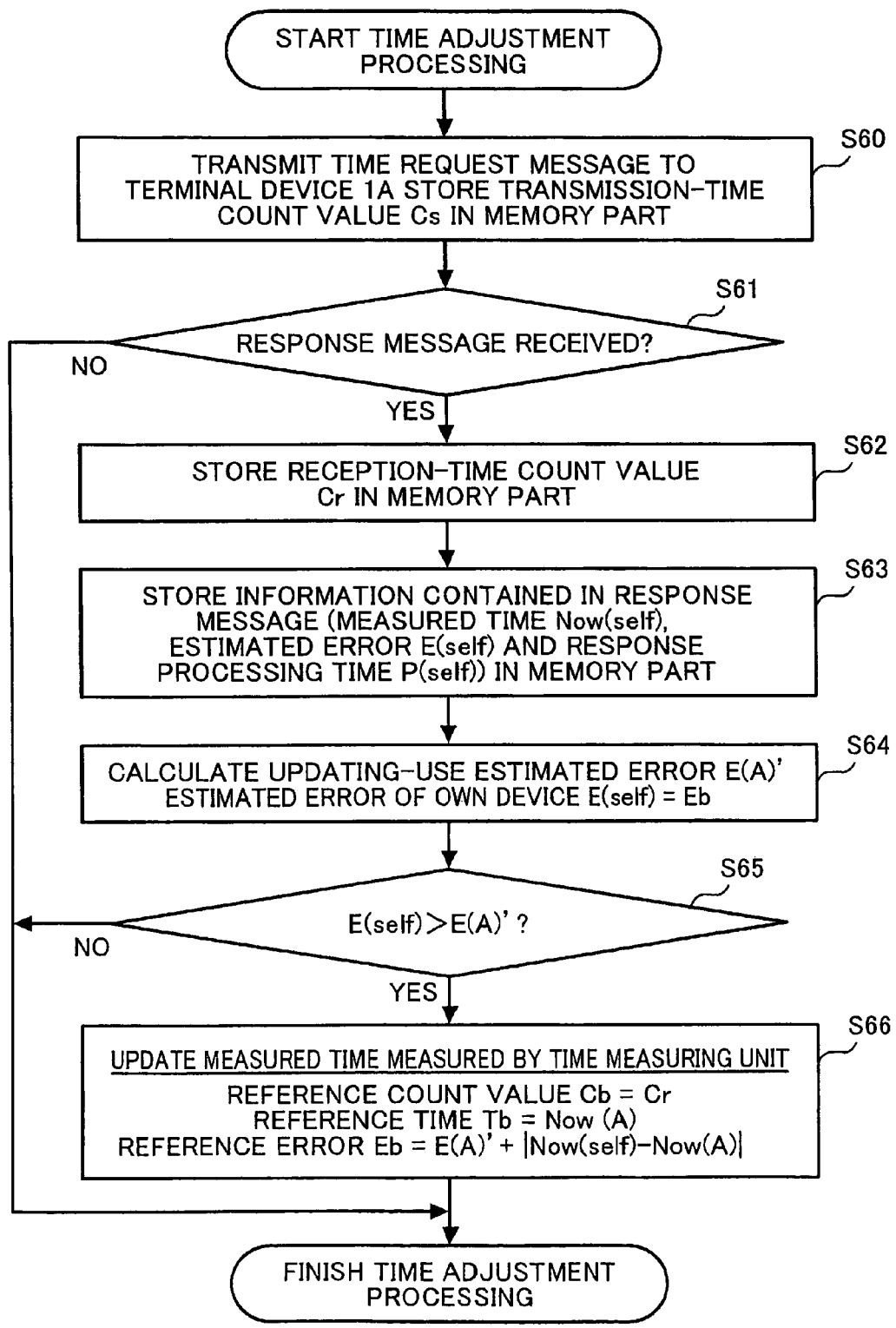
FIG. 14 is a flowchart of time adjustment processing in the terminal device according to the third embodiment.

Next, one example of the specific operation of the terminal device 1 according to the third embodiment is explained in conjunction with drawings. FIG. 14 is a flowchart of time adjustment processing in the terminal device 1 of the third embodiment. Here, main processing and time information transmission processing of this embodiment is substantially equal to the processing of the first embodiment (steps S1 to S8 in FIG. 6, and steps S20, S21 in FIG. 8).

The time adjustment processing of the terminal device 1 according to the third embodiment is constituted of processing executed in steps S60 to S66 shown in FIG. 14. However, the processing in steps S60 to S65 are substantially equal to the corresponding processing of the first embodiment (steps S10 to S15 in FIG. 7) and hence, the processing in step S66 is explained here.

In step S66, a CPU 31 calculates the reference error Eb using a following formula (6).

$$Eb = E(A)' + |\text{Now(self)} - \text{Now}(A)| \qquad (6)$$

In calculating the reference error Eb using the above-mentioned formula (6), the CPU 31 calculates the difference between a measured time Now (self) measured by the time measuring unit of its own terminal device and a measured time Now (A) of the terminal device 1A, and stores a value obtained by adding an updating-use estimated error E (A)' to a result of calculation in a memory part 29 as a reference error Eb which becomes an estimated error E (self) of its own terminal device. In this manner, the CPU 31 functions as a time updating unit which sets a value obtained by adding the updating-use estimated error E (A)' to the difference |Now (self)−Now(A)| between the measured time Now (self) measured by the time measuring unit of its own terminal device and the received measured time Now (A) as the reference error Eb stored in the memory part 29.

By setting the reference error Eb in such a manner, the reference error Eb after the adjustment is increased when the difference between the measured times measured by the time measuring unit 10 before and after the adjustment is large and hence, the estimated error E (self) is increased when the time adjustment processing is executed next time.

Accordingly, for example, even when the time measuring unit is adjusted based on the measured time of the terminal device 1 whose estimated error is made small due to the intentional displacement of the measured time, provability that the adjustment of the time measuring unit is performed in the next time adjustment processing can be increased thus eliminating a state in which the measured time is displaced within a short period.

Although several embodiments of the present invention have been explained in detail in conjunction with drawings heretofore, they are provided merely as examples, and the present invention can be carried out in other modes to which various modifications and improvements are applied based on knowledge of those who are skilled in the art.

For example, in the terminal device 1 of the second embodiment, in calculating the reference error Eb, the difference between the measured times measured by the time measuring unit before and after the adjustment may be reflected on the estimated error as in the case of the terminal device 1 of the third embodiment.

Further, in the first embodiment, the updating-use estimated error is calculated by taking the information transmission time into consideration. However, when the estimated error is increased corresponding to a lapsed time from a point of time that the time adjustment of the time measuring unit is performed, the updating-use estimated error may not be calculated by taking the information transmission time into consideration.

What is claimed is:

1. A terminal device comprising:
   a time measuring unit which is configured to measure time;
   an estimated error memory unit which is configured to store an estimated error between a measured time measured by the time measuring unit and current time;
   a time information requesting unit which is configured to request another terminal device to transmit a measured time and an estimated error of the other terminal device;
   a time information transmitting unit which is configured to transmit the measured time measured by the time measuring unit and the estimated error stored in the estimated error memory unit to a requesting terminal device in response to a request from the requesting terminal device;
   a time information receiving unit which is configured to receive the measured time and the estimated error of the other terminal device requested by the time information requesting unit;

an estimated error calculating unit which is configured to calculate an error containing the estimated error of the other terminal device received by the time information receiving unit as an updating-use estimated error; and a time updating unit which is configured, when the updating-use estimated error calculated by the estimated error calculating unit is smaller than the estimated error stored in the estimated error memory unit, to store the updating-use estimated error in the estimated error memory unit as an updated estimated error thus updating the estimated error, and to adjust the measured time measured by the time measuring unit based on the measured time of the other terminal device received by the time information receiving unit.

2. The terminal device according to claim 1, wherein the estimated error calculating unit is configured to calculate the updating-use estimated error by adding information transmission time between the terminal device and the other terminal device to the estimated error received by the time information receiving unit.

3. The terminal device according to claim 2, wherein the estimated error calculating unit is configured to calculate the updating-use estimated error by further adding a lapsed time error corresponding to a lapsed time from a point of time that the estimated error is finally stored in the estimated error memory unit to a value acquired by adding the information transmission time to the estimated error received by the time information receiving unit.

4. The terminal device according to claim 2, wherein the time measuring unit includes a counting unit which is configured to increase a count value in accordance with every unit time, a reference time memory unit which is configured to store time information acquired at predetermined timing as reference time, a reference count value memory unit which is configured to store the count value from the counting unit at the predetermined timing as a reference count value, and a time calculating unit which is configured to subtract the reference count value from the count value counted by the counting unit, and to set a value which is obtained by adding the reference time to a value obtained by the subtraction as the measured time, and the time measuring unit further includes:
  a first count memory unit which is configured to store a first count value of the counting unit when a request from the time information requesting unit is made as the first count value; and
  a second count memory unit which is configured to store a second count value of the counting unit when the reception by the time information receiving unit is performed as the second count value,
  the time information transmitting unit is configured to transmit a lapsed time from a point of time that the request from the requesting terminal device is received to a point of time that the measured time and the estimated error are transmitted to the requesting terminal device,
  the time information receiving unit is configured to receive the lapsed time in addition to the measured time and the estimated error of the other terminal device requested by the time information requesting unit, and
  the estimated error calculating unit is configured to calculate the information transmission time by subtracting the lapsed time from a value obtained by subtracting the first count value from the second count value and by dividing the value by 2.

5. The terminal device according to claim 1, wherein the time updating unit is configured, when the updating-use estimated error is smaller than the estimated error stored in the estimated error memory unit, to store and set a value acquired by adding the updating-use estimated error to a differential between a measured time measured by the time measuring unit and the measured time received by the time information receiving unit in the estimated error memory unit as the estimated error.

6. A non-transitory computer readable storage medium that stores a computer-executable program that causes a computer of a terminal device to execute the steps of:
  storing an estimated error between a measured time measured by a time measuring unit of the terminal device and current time in an estimated error memory unit;
  requesting another terminal device to transmit a measured time and an estimated error of the other terminal device;
  transmitting the measured time measured by the time measuring unit and the estimated error stored in the estimated error memory unit to a requesting terminal device in response to a request from the requesting terminal device;
  receiving the measured time and the estimated error of the other terminal device which are requested in the step of requesting the transmission of the measured time and the estimated error of the other terminal device;
  calculating an error which contains the estimated error of the other terminal device received in the step of receiving the measured time and the estimated error of the other terminal device as an updating-use estimated error;
  determining whether or not the updating-use estimated error calculated in the step of calculating the updating-use estimated error is smaller than the estimated error stored in the estimated error memory unit;
  adjusting the measured time measured by the time measuring unit based on the measured time of the other terminal device received in the step of receiving the measured time and the estimated error of the other terminal device when the updating-use estimated error is smaller than the estimated error in the step of determining whether or not the updating-use estimated error is smaller than the estimated error; and
  updating the estimated error by storing the updating-use estimated error as an updated estimated error in the estimated error memory unit when the updating-use estimated error is smaller than the estimated error in the step of determining whether or not the updating-use estimated error is smaller than the estimated error.

7. A communication system which includes a plurality of terminal devices and is configured to perform transmission and reception of information between the terminal devices, wherein the terminal device comprising:
  a time measuring unit which is configured to measure time;
  an estimated error memory unit which is configured to store an estimated error between a measured time measured by the time measuring unit and current time;
  a time information requesting unit which is configured to request another terminal device to transmit a measured time and an estimated error of the other terminal device;
  a time information transmitting unit which is configured to transmit the measured time measured by the time measuring unit and the estimated error stored in the estimated error memory unit to a requesting terminal device in response to a request from the requesting terminal device;

a time information receiving unit which is configured to receive the measured time and the estimated error of the other terminal device requested by the time information requesting unit;

an estimated error calculating unit which is configured to calculate an error containing the estimated error of the other terminal device received by the time information receiving unit as an updating-use estimated error; and a time updating unit which is configured, when the updating-use estimated error calculated by the estimated error calculating unit is smaller than the estimated error stored in the estimated error memory unit, to store the updating-use estimated error in the estimated error memory unit as an updated estimated error thus updating the estimated error, and to adjust the measured time measured by the time measuring unit based on the measured time of the other terminal device received by the time information receiving unit.

8. A time adjustment method of terminal devices in a communication system which includes a plurality of terminal devices and is configured to perform transmission and reception of information between the terminal devices, the time adjustment method comprising the steps of:

storing an estimated error between a measured time measured by a time measuring unit of the terminal device and current time in an estimated error memory unit;

requesting another terminal device to transmit a measured time and an estimated error of the other terminal device;

transmitting the measured time measured by the time measuring unit and the estimated error stored in the estimated error memory unit to a requesting terminal device in response to a request from the requesting terminal device;

receiving the measured time and the estimated error of the other terminal device which are requested in the step of requesting the transmission of the measured time and the estimated error of the other terminal device;

calculating an error which contains the estimated error of the other terminal device received in the step of receiving the measured time and the estimated error of the other terminal device as an updating-use estimated error;

determining whether or not the updating-use estimated error calculated in the step of calculating the updating-use estimated error is smaller than the estimated error stored in the estimated error memory unit;

adjusting the measured time measured by the time measuring unit based on the measured time of the other terminal device received in the step of receiving the measured time and the estimated error of the other terminal device when updating-use estimated error is smaller than the estimated error in the step of determining whether or not the updating-use estimated error is smaller than the estimated error; and updating the estimated error by storing the updating-use estimated error calculated in the step of calculating the updating-use estimated error in the estimated error memory unit as an updated estimated error in the estimated error memory unit when the updating-use estimated error is smaller than the estimated error in the step of determining whether or not the updating-use estimated error is smaller than the estimated error.

* * * * *